US008572890B1

(12) United States Patent  (10) Patent No.: US 8,572,890 B1
Lark et al.                (45) Date of Patent:  *Nov. 5, 2013

(54) INSECT TRAP (75) Inventors: Larry Mitch Lark, St. Paul, MN (US);
Brian Philip Carlson, St. Paul, MN
(US); Scott R. Limback, St. Paul, MN
(US)

(73) Assignee: Ecolab USA Inc., St. Paul, MN (US)

( * ) Notice: Subject to any disclaimer, the term of this patent is extended or adjusted under 35 U.S.C. 154(b) by 777 days.

This patent is subject to a terminal disclaimer.

(21) Appl. No.: 11/928,623

(22) Filed: Oct. 30, 2007

(51) Int. Cl.
*A01M 1/04* (2006.01)

(52) U.S. Cl.
USPC .......................................... 43/113

(58) Field of Classification Search
USPC .................. 43/113, 107, 124, 132.1
See application file for complete search history.

(56) References Cited

U.S. PATENT DOCUMENTS

| 1,792,774 | A | * | 2/1931 | Snider | 43/81 |
| 4,074,457 | A | * | 2/1978 | Sato et al. | 43/113 |
| 4,117,624 | A | * | 10/1978 | Phillips | 43/113 |
| 4,709,503 | A | * | 12/1987 | McQueen | 43/114 |
| 4,776,822 | A | * | 10/1988 | Dougherty et al. | 445/45 |
| 4,815,231 | A | * | 3/1989 | McQueen | 43/114 |
| 5,325,625 | A | * | 7/1994 | Liu et al. | 43/114 |
| 5,365,690 | A | * | 11/1994 | Nelson et al. | 43/113 |
| 5,438,792 | A | * | 8/1995 | Monett et al. | 43/114 |
| 5,505,017 | A | * | 4/1996 | Nelson et al. | 43/113 |
| 5,513,465 | A | * | 5/1996 | Demarest et al. | 43/113 |
| 5,651,211 | A | * | 7/1997 | Regan et al. | 43/113 |
| 5,713,153 | A | * | 2/1998 | Cook et al. | 43/114 |
| 5,974,727 | A | | 11/1999 | Gilbert | |
| 6,393,759 | B1 | * | 5/2002 | Brown et al. | 43/113 |
| 6,442,889 | B1 | * | 9/2002 | Lee | 43/114 |
| 6,493,986 | B1 | * | 12/2002 | Nelson et al. | 43/113 |
| D498,286 | S | | 11/2004 | Loerakker et al. | |
| 6,959,510 | B1 | | 11/2005 | Nelson et al. | |
| 7,036,268 | B2 | | 5/2006 | Taylor et al. | |
| 7,096,621 | B2 | * | 8/2006 | Nelson et al. | 43/113 |
| 7,143,542 | B2 | * | 12/2006 | Taylor et al. | 43/113 |
| 7,284,350 | B2 | * | 10/2007 | Nelson et al. | 43/113 |
| 2001/0013194 | A1 | * | 8/2001 | Greening | 43/113 |
| 2002/0032980 | A1 | * | 3/2002 | Nelson | 43/113 |
| 2002/0078620 | A1 | * | 6/2002 | Nelson et al. | 43/113 |
| 2003/0089023 | A1 | * | 5/2003 | Nelson et al. | 43/113 |
| 2003/0089024 | A1 | * | 5/2003 | Nelson et al. | 43/113 |
| 2004/0159040 | A1 | * | 8/2004 | Chen | 43/112 |
| 2005/0126069 | A1 | * | 6/2005 | Taylor et al. | 43/113 |
| 2006/0080888 | A1 | * | 4/2006 | Greening | 43/113 |
| 2007/0011941 | A1 | * | 1/2007 | Nelson et al. | 43/113 |

* cited by examiner

*Primary Examiner* — David Parsley
(74) *Attorney, Agent, or Firm* — IPLM Group, P.A.

(57) ABSTRACT

An insect trap includes a support structure and a lid. The support structure includes a bottom portion and a rear portion extending upward from a rear of the bottom portion. The rear portion includes a first connector. The lid is pivotally connected to the rear portion, and the lid includes an inside surface with a second connector. The support structure and the lid define a cavity and have an open position and a closed position. The bottom portion is configured and arranged to receive a first panel member, the first connector is configured and arranged to receive a second panel member, and the second connector is configured and arranged to receive a third panel member. A bracket could be used to support a fourth panel member. The support structure could include a bracket about which a power cord is windable to vary the length of the power cord.

7 Claims, 13 Drawing Sheets

INSECT TRAP

FIELD OF THE INVENTION

The present invention relates to an insect trap and, more particularly, to a flying insect trap.

BACKGROUND OF THE INVENTION

Flying insect traps with insect attractant light sources and immobilization devices are commonly used to attract and trap flying insects within the traps. The present invention addresses the problems associated with the prior art devices and provides for an improved insect trap.

SUMMARY OF THE INVENTION

One aspect of the present invention provides an insect trap including a support structure, a lid, and a first source of insect attractant light. The support structure includes a bottom portion and a rear portion extending upward from a rear of the bottom portion. The rear portion includes a first connector. The lid is pivotally connected to the rear portion, and the lid includes an inside surface with a second connector. The support structure and the lid define a cavity. The first source of insect attractant light is supported by the support structure within the cavity. The bottom portion is configured and arranged to receive a first panel member, the first connector is configured and arranged to receive a second panel member, and the second connector is configured and arranged to receive a third panel member.

Another aspect of the present invention provides an insect trap including a support structure, a lid, a first source of insect attractant light, and a bracket. The support structure includes a bottom portion and a rear portion extending upward from a rear of the bottom portion. The rear portion includes a first connector. The lid is pivotally connected to the rear portion, and the lid includes an inside surface with a second connector. The support structure and the lid define a cavity. The first source of insect attractant light is supported by the support structure within the cavity. The bracket is connected to the bottom portion proximate the first source of insect attractant light, and the bracket includes a third connector. The third connector is positioned between the first connector and the second connector. The bottom portion is configured and arranged to receive a first panel member, the first connector is configured and arranged to receive a second panel member, the second connector is configured and arranged to receive a third panel member, and the third connector is configured and arranged to receive a fourth panel member.

Another aspect of the present invention provides a method of installing an insect trap. A mounting bracket having an integral leveling device, a supporting portion, a first aperture, and a second aperture is obtained. A first fastener is inserted into a mounting surface. The first fastener is inserted through the first aperture in the mounting bracket and the mounting bracket is positioned on the mounting surface. The mounting bracket is leveled with the leveling device. A second fastener is inserted through the second aperture and into the mounting surface. A housing having a receiving portion is obtained. The receiving portion is configured and arranged to receive the supporting portion and releasably connect the housing to the mounting bracket. The supporting portion is inserted into the receiving portion thereby releasably connecting the housing to the mounting bracket.

Another aspect of the present invention provides an insect trap including a housing, a ballast, and a power cord. The housing includes a support structure with a top and a bottom. The top is pivotally connected to a lid, and the bottom is connected to a base. The base has a cavity, a front side, and a bottom side. The front side includes a first aperture, a second aperture, and a bracket. The bottom side includes a third aperture. The ballast is positioned in the cavity. The power cord includes a first end, a second end, and an intermediate portion. The first end is connected to the ballast. A portion of the intermediate portion extends through the first aperture from the cavity to the front side, is wound about the bracket, extends through the second aperture from the front side to the cavity, and extends through the third aperture from the cavity to proximate the bottom side. The second end includes a plug. The lid extends over the front side thereby covering the portion of the intermediate portion of the power cord proximate the front side. The intermediate portion is windable and unwindable about the bracket to adjust a length of the intermediate portion from proximate the third aperture to the second end.

Another aspect of the present invention provides an insect trap comprising a housing including a support structure and a lid defining a cavity. The housing has a top, a first side, and a second side. The support structure includes a bottom portion and a rear portion extending upward from a rear of the bottom portion. The rear portion has a first protrusion proximate the top and the first side and a second protrusion proximate the top and the second side. The first protrusion has a first inner surface and a first outer surface and the second protrusion has a second inner surface and a second outer surface. The first inner surface has a first lower depression and a first upper depression with a first raised portion between the first lower depression and the first upper depression, and the first outer surface has a first receiver. The second inner surface has a second lower depression and a second upper depression with a second raised portion between the second lower depression and the second upper depression, and the second outer surface has a second receiver. The lid includes a first connecting member proximate the first side and a second connecting member proximate the second side. The first connecting member has a first outer connector and a first inner connector. The first receiver receives the first outer connector, and the first inner connector is configured and arranged to move between the first lower depression and the first upper depression. The second connecting member has a second outer connector and a second inner connector. The second receiver receives the second outer connector, and the second inner connector is configured and arranged to move between the second lower depression and the second upper depression. The lid is pivotally connected to the rear portion about the outer connectors and has a closed position and an open position. The lid is in the closed position when the inner connectors are in the lower depressions, and the lid is in the open position when the inner connectors are in the upper depressions. The connecting member deflects outward proximate the inner connectors as the inner connectors move over the raised portions. The upper depressions hold the lid in the open position.

DETAILED DESCRIPTION OF A PREFERRED EMBODIMENT

A preferred embodiment insect trap constructed according to the principles of the present invention is designated by the numeral 100 in the drawings.

Preferably, the insect trap 100 is mounted on a vertical mounting surface, such as a wall, at a height above eye level. However, the insect trap 100 could also be mounted on a horizontal mounting surface or any other suitable mounting surface. Throughout this description, the insect trap 100 is described in an orientation for mounting on a vertical mounting surface, but it is recognized that the insect trap 100 could be mounted in other orientations. Thus, the orientation described does not limit the insect trap 100 from being mounted in other orientations.

Figure 1:
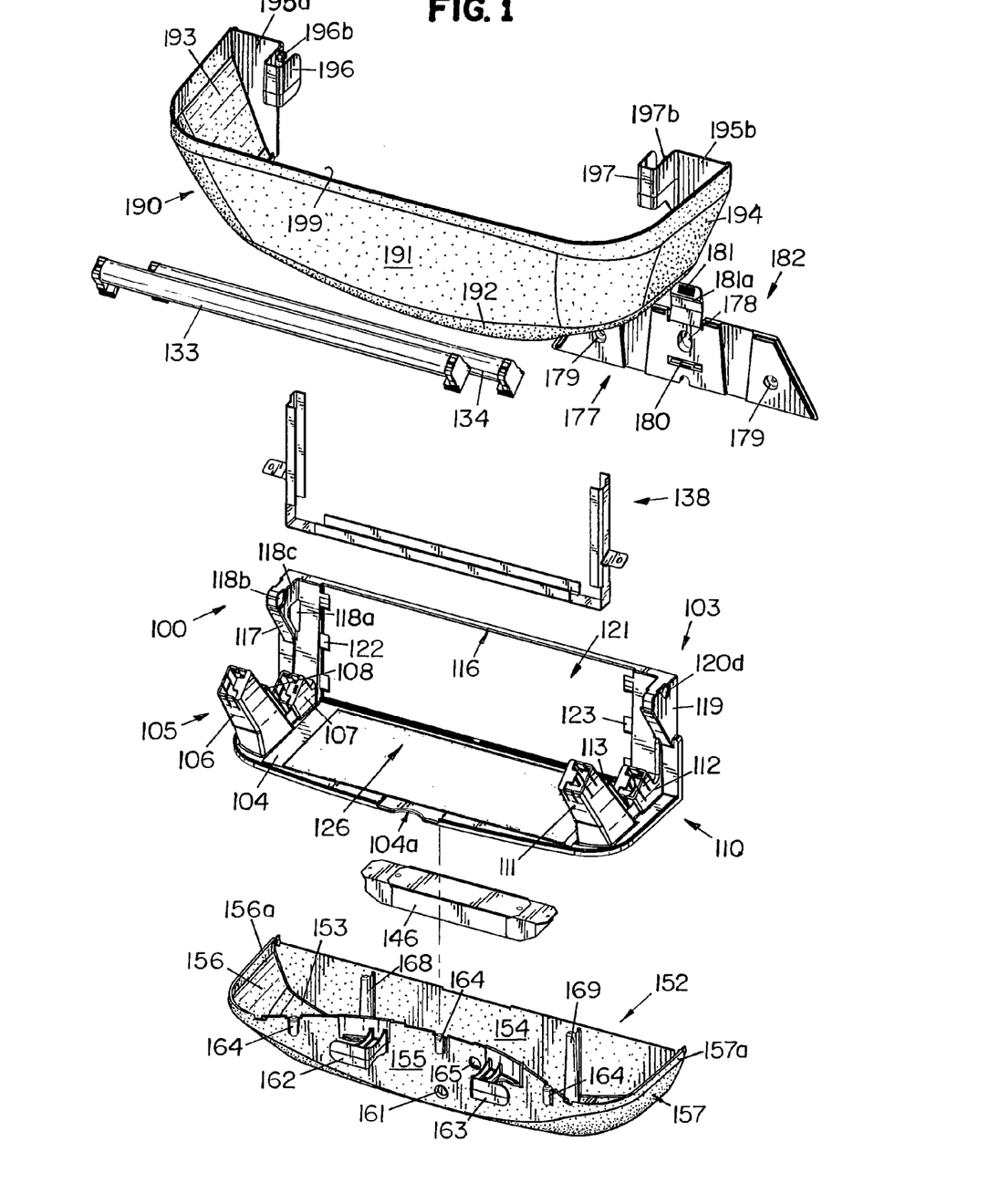
FIG. 1 is an exploded front perspective view of an insect trap constructed according to the principles of the present invention.
Figure 2:
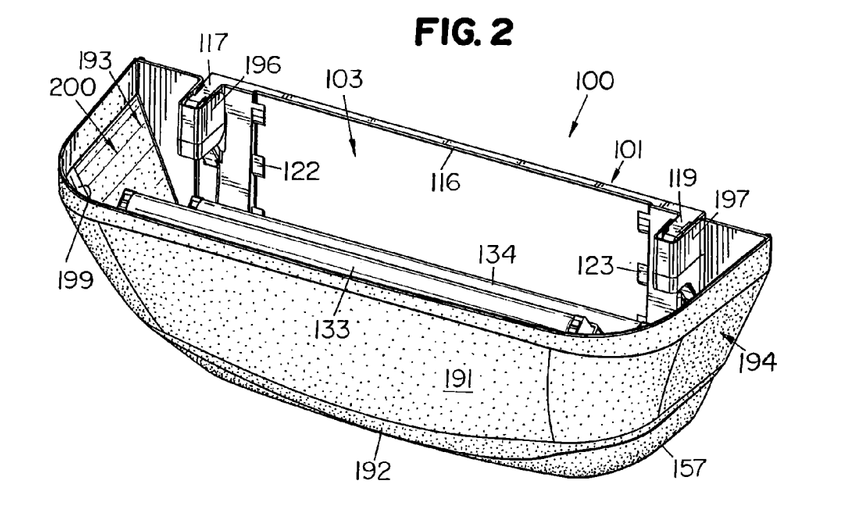
FIG. 2 is a front perspective view of the insect trap shown in FIG. 1.
Figure 3:
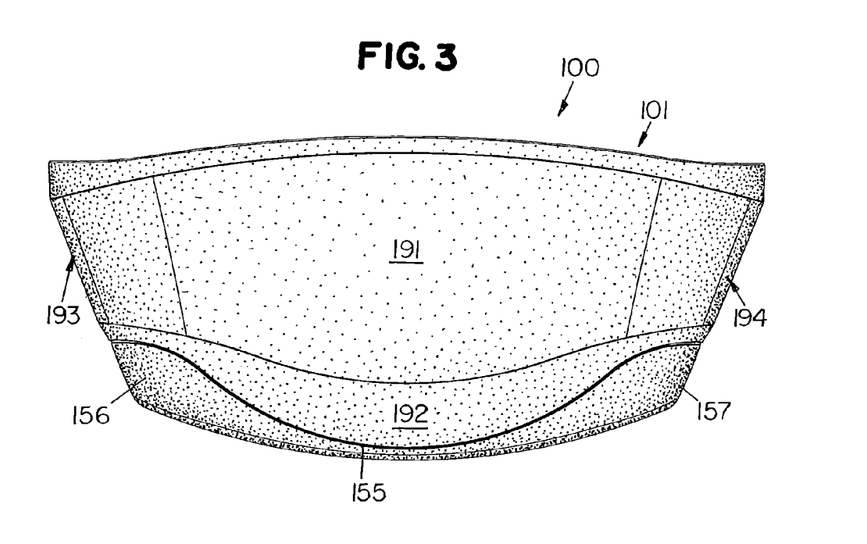
FIG. 3 is a front view of the insect trap shown in FIG. 1.

The insect trap 100 includes a housing 101 defining an opening 199 into a cavity 200 in which the insects are trapped. The housing 101 includes a lid 190 pivotally connected to a support structure 103, which is connected to a base 152. The support structure 103 includes a bottom portion 104 and a rear wall portion 116 extending upward from proximate a rear side of the bottom portion 104. The bottom portion 104 and the rear wall portion 116 define a cavity 126. The support structure 103 has a first side 105 and a second side 110. In the orientation shown in FIG. 1, the first side 105 is proximate the left side and the second side 110 is proximate the right side.

The bottom portion 104 includes a recessed area 104a configured and arranged to receive a maintenance record card (not shown) proximate the front and the middle of the bottom portion 104. Preferably, the maintenance record card can simply be slid into and out of the recessed area 104a. The bottom portion 104 also includes a first bulb support 106 and a second bulb support 107 proximate the first side 105 and a first bulb support 111 and a second bulb support 112 proximate the second side 110. Preferably, the bulb supports extend upward and outward at a forward angle from the bottom portion 104.

The first bulb supports preferably extend outward from proximate the middle of the bottom portion 104 and support a first bulb 133 proximate the front side of the bottom portion 104. The second bulb supports preferably extend outward from proximate the rear side of the bottom portion 104 and support a second bulb 134 proximate the middle of the bottom portion 104.

The first bulb supports 106 and 111 connect to and support a first bulb 133, which extends between the first bulb supports 106 and 111 and has a connector at each end that plugs into the respective first bulb support. The second bulb supports 107 and 112 connect to and support a second bulb 134, which extends between the second bulb supports 107 and 112 and has a connector at each end that plugs into the respective second bulb support.

Figure 7:
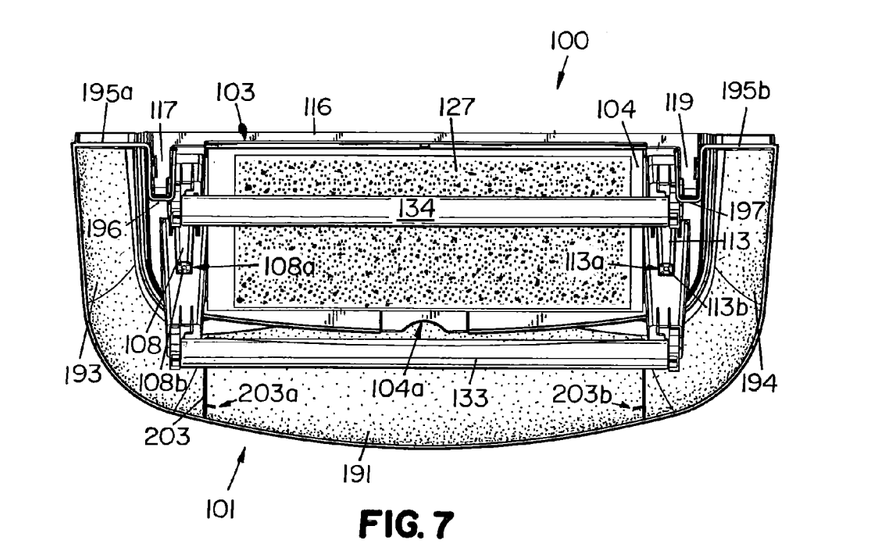
FIG. 7 is a top view of the insect trap shown in FIG. 1.

The first bulb supports 106 and 111 include bracket mounts 108 and 113, respectively, extending outward from the rear sides of the first bulb supports 106 and 111 proximate the middle of the bottom portion 104. The bracket mounts 108 and 113 provide mounting surfaces for a bracket 138, and the mounting surfaces include apertures 108b and 113b through which a fastener is inserted to connect the bracket 138 to the bracket mounts 108 and 113. Mounting surfaces 108a and 113a are shown in FIG. 7. The bracket mounts 108 and 113 extend outward from the first bulb supports 106 and 111 proximate the second bulb supports 107 and 112 and support the bracket 138 between the bulbs 133 and 134. The bracket 138 is described in more detail below.

The rear wall 116 includes a first protrusion 117 proximate the top and the first side 105 and a second protrusion 119 proximate the top and the second side 110. The protrusions 117 and 119 are preferably triangular shaped portions extending laterally outward forwardly from the rear wall 116. The first protrusion 117 includes an inner surface 117a and an outer surface 117b. The inner surface 117a includes a raised portion 118c between a lower depression 118a and an upper depression 118b. The outer surface 117b includes a receiver (not shown). The second protrusion 119 includes an inner surface 119a and an outer surface 119b. The inner surface 119a includes a raised portion (not shown) between a lower depression (not shown) and an upper depression (not shown). The outer surface 119b includes a receiver 120d. The depressions and the receivers could be apertures or voids in the protrusions, and the raised portions are preferably raised relative to the depressions and are not necessarily raised relative to the inner surfaces of the protrusions.

The rear wall 116 also includes a recessed area 121 between the protrusions 117 and 119. A first connector 122 is preferably at least one tab extending from proximate the first side 105 inward proximate the recessed area 121, and a second connector 123 is preferably at least one tab extending from proximate the second side 110 inward proximate the recessed area 121. The recessed area 121 is configured and arranged to receive a panel member such as a glue board or a board with a reflective surface, and the connectors 122 and 123 assist in holding the panel member within the recessed area 121. Although three connectors 122 and 123 are shown in the drawings, any number could be used.

Figure 14:
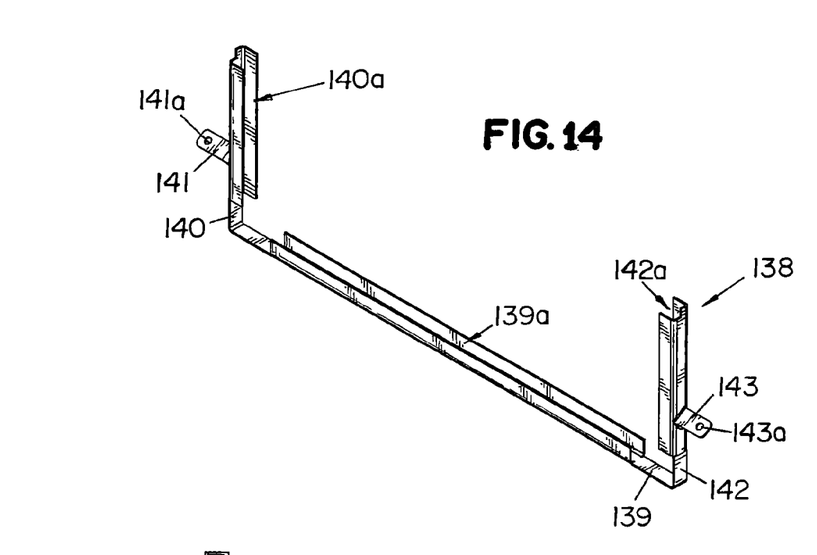
FIG. 14 is a front perspective view of a bracket of the insect trap shown in FIG. 1.
Figure 15:
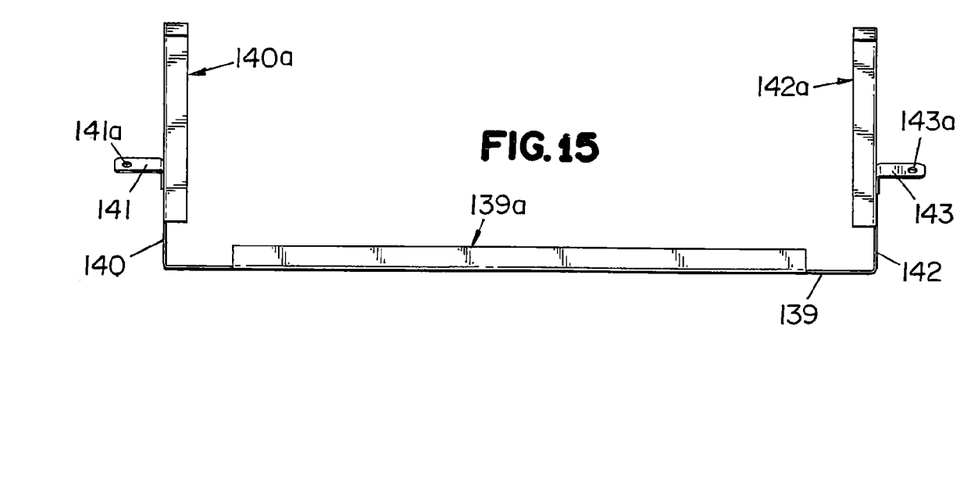
FIG. 15 is a front view of the bracket shown in FIG. 14.
Figure 16:
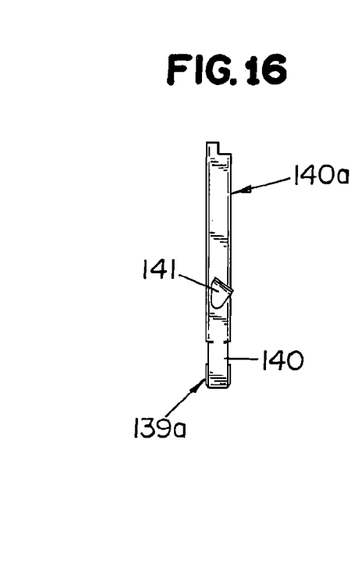
FIG. 16 is a left side view of the bracket shown in FIG. 14.

The bracket 138, shown in FIGS. 14-16, is preferably a U-shaped piece with a longer bottom 139 and shorter sides 140 and 142 extending upward from the bottom 139.

The bottom 139 includes a channel portion 139a, the first side 140 includes a channel portion 140a, and the second side 142 includes a channel portion 142a. The channel portions are preferably elongate U-shaped channel portions configured and arranged to receive three sides of a panel member such as a glue board or a board with a reflective surface. One or two panel members may be positioned in the bracket 138. If two panel members are used, they should preferably be positioned back-to-back in the bracket 138. The first side 140 has a connector 141 extending outward therefrom, and the connector 141 includes an aperture 141a through which a fastener is inserted to connect the connector 141 to the bracket mount 108. The second side 142 has a connector 143 extending outward therefrom, and the connector 143 includes an aperture 143a through which a fastener is inserted to connect the connector 143 to the bracket mount 113. The connectors 141 and 143 are preferably angled to correspond with the angles of the mounting surfaces so that the bracket 138 is substantially vertically oriented.

Figure 4:
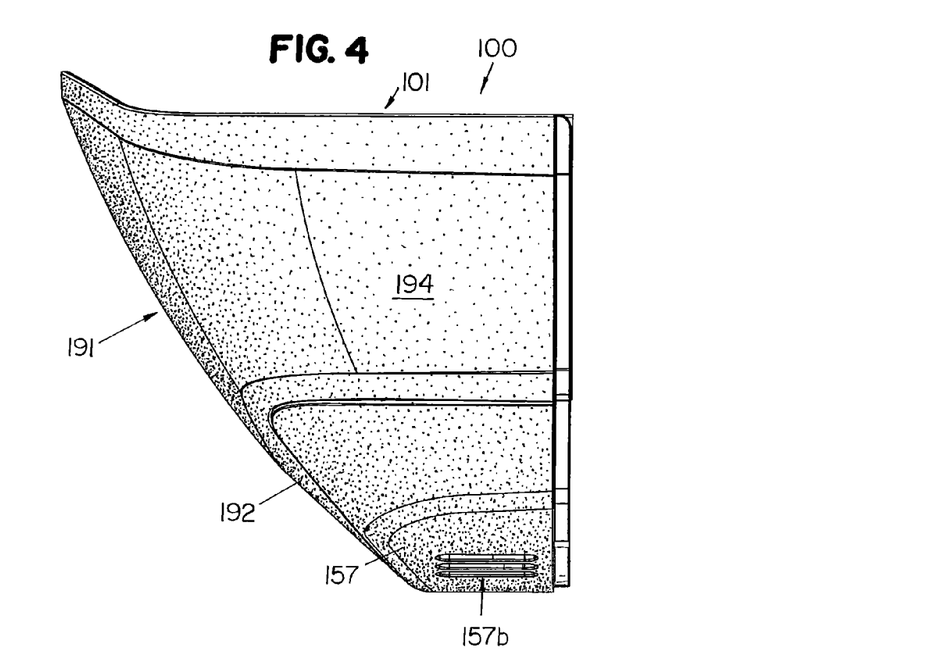
FIG. 4 is a right side view of the insect trap shown in FIG. 1.
Figure 5:
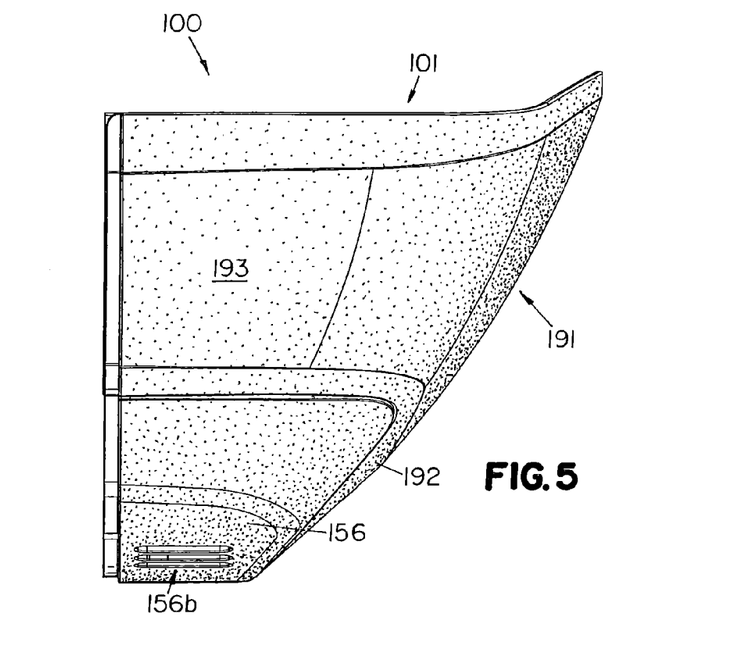
FIG. 5 is a left side view of the insect trap shown in FIG. 1.
Figure 6:
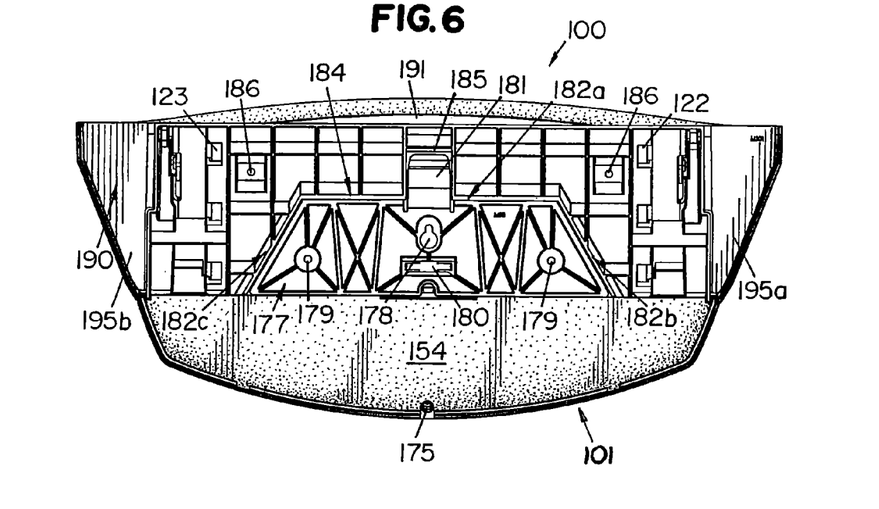
FIG. 6 is a rear view of the insect trap shown in FIG. 1.
Figure 10:
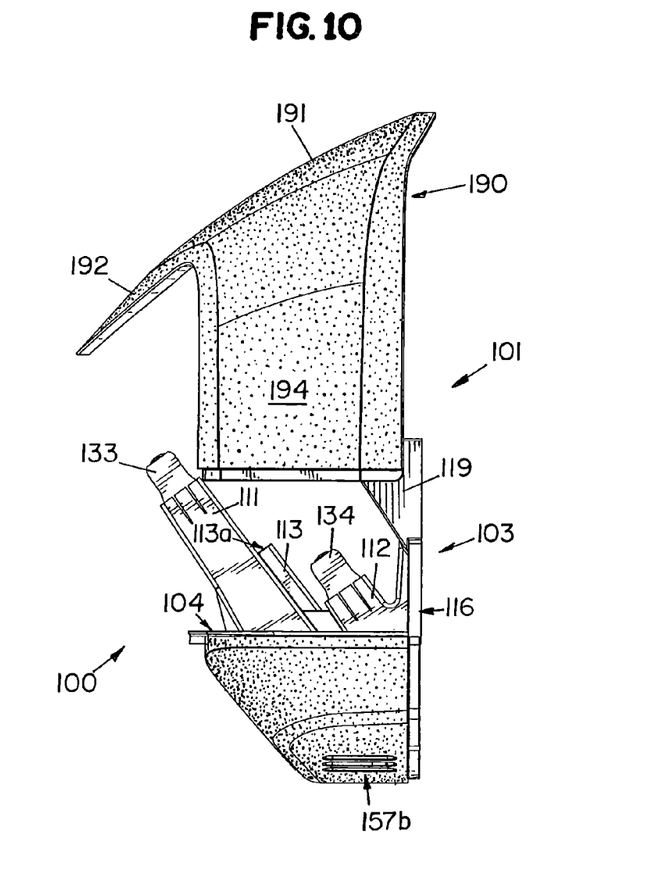
FIG. 10 is a right side view of the insect trap shown in FIG. 9.

The base 152 includes a front portion 155 that curves downward toward a bottom 153 portion and around toward sides 156 and 157. A relatively flat rear portion 154 interconnects the bottom portion 153 and the sides 156 and 157. The front portion 155, the bottom portion 153, the sides 156 and 157 and the rear portion 154 define a cavity 159 in which a ballast 146 is positioned. The front portion 155 includes a first bracket 162 and a second bracket 163, which are L-shaped protrusions facing outward away from one another, with a first aperture 161 proximate the bottom of the front portion 155 and between the brackets 162 and 163. A second aperture 165 in the front portion 155 is proximate the top of the front portion 155 and the second bracket 163. The front portion 155 also includes receptacles 164, which are cylindrical members with bores for receiving fasteners, positioned proximate the top and proximate the middle and sides of the front portion 155. The rear portion 154 includes a first support 168 and a second support 169, which are cylindrical members with bores for receiving fasteners, positioned proximate the sides of the rear portion 154. Fasteners (not shown) extend through apertures (not shown) in the bottom portion 104 of the support structure 103 and into the bores of the receptacles 164 and the supports 168 and 169 for connecting the support structure 103 to the base 152. The sides 156 and 157 include upward extending lips 156a and 157a proximate the top of the sides 156 and 157 and include vents 156b and 157b proximate the bottom of the sides 156 and 157. The vents 156b and 157b are optional and are shown in FIGS. 4, 5, and 10.

Figure 8:
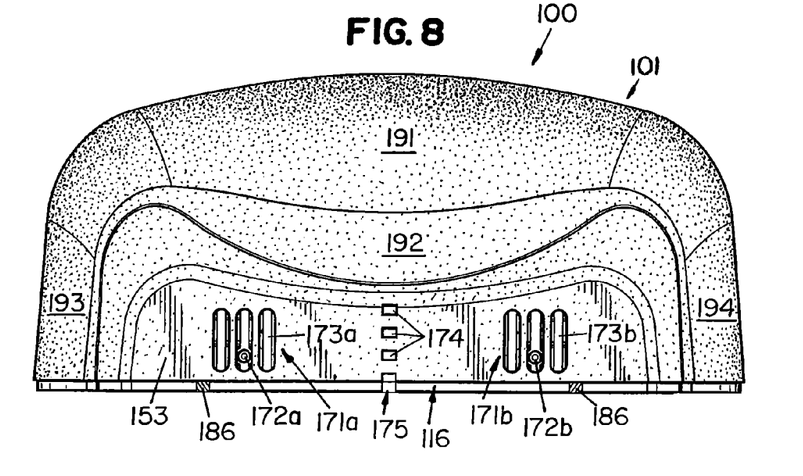
FIG. 8 is a bottom view of the insect trap shown in FIG. 1.
Figure 9:
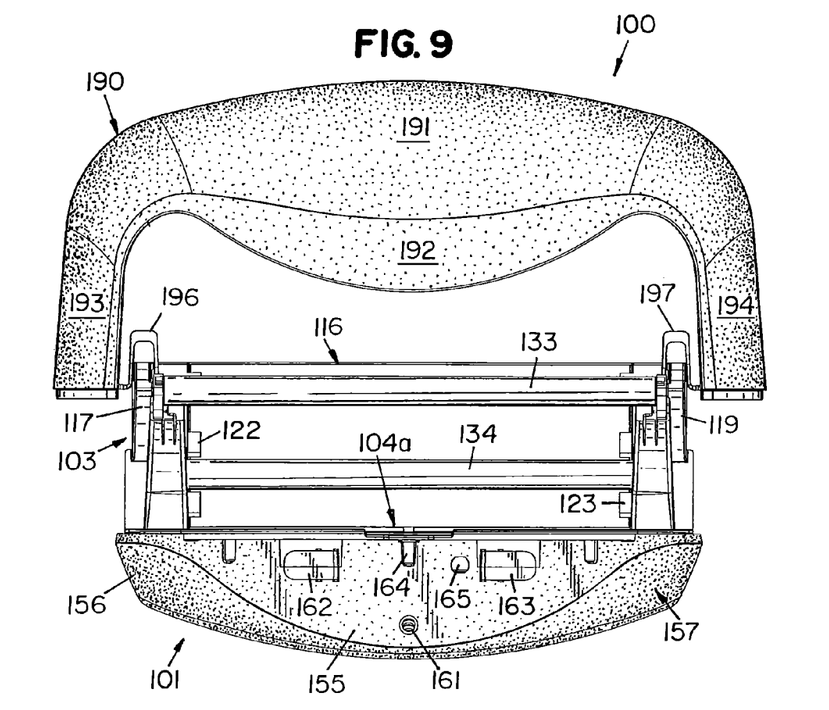
FIG. 9 is a front view of the insect trap shown in FIG. 1 with a lid in an open position.
Figure 17:
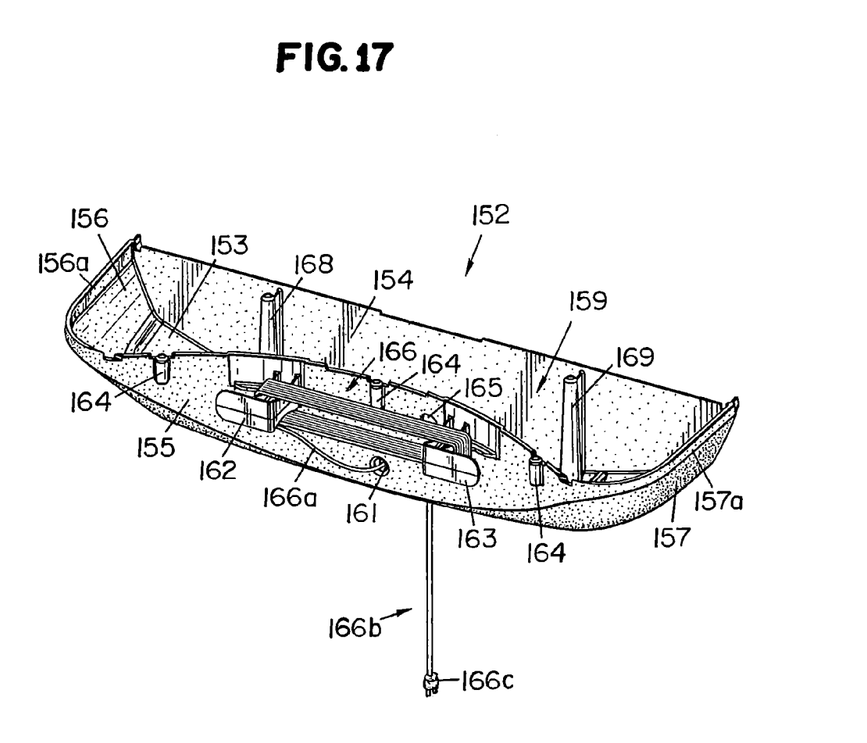
FIG. 17 is a front perspective view of a base of the insect trap shown in FIG. 1 with a power cord.

As shown in FIG. 8, the bottom portion 153 includes vents 171a and 171b and corresponding baffles 173a and 173b proximate the sides. Bores 172a and 172b receive fasteners connecting the base 152 to the support structure 103. Between the vents 171a and 171b are connectors 174, which are upwardly extending up-side down L-shaped brackets, and an exit 175. A power cord 166, shown in FIG. 17, includes a first end (not shown) connected to the ballast 146 within the cavity 159, an intermediate portion 166a, and a second end 166b connected to a plug 166c. The intermediate portion 166b extends through the aperture 165, from the cavity 159 to proximate the front portion 155, and then any excess cord is wound about the brackets 162 and 163. The intermediate portion 166a then extends through the aperture 161, from proximate the front portion 155 into the cavity 159. The connectors 174 keep the intermediate portion 166a in place within the cavity 159, and then the intermediate portion 166a extends out of the cavity 159 through the exit 175 to a power supply such as an outlet, into which the plug 166c is inserted.

The lid 190 includes a front portion 191 curving downward toward a bottom portion 192 and around toward sides 193 and 194. The tops of the front portion 191 and the sides 193 and 194 define an opening 199 into a cavity 200 defined by the lid 190. Proximate the first side 193 is a first rear portion 195a and proximate the second side 194 is a second rear portion 195b. A first connector 196 is connected to the first rear portion 195a, and a second connector 197 is connected to the second rear portion 195b. The connectors 196 and 197 are U-shaped bracket members with one side connected to the respective rear portion and extending forwardly into the cavity 200 defined by the lid 190. Thus, openings in the connectors 196 and 197 are proximate the rear of the lid 190.

Figure 20:
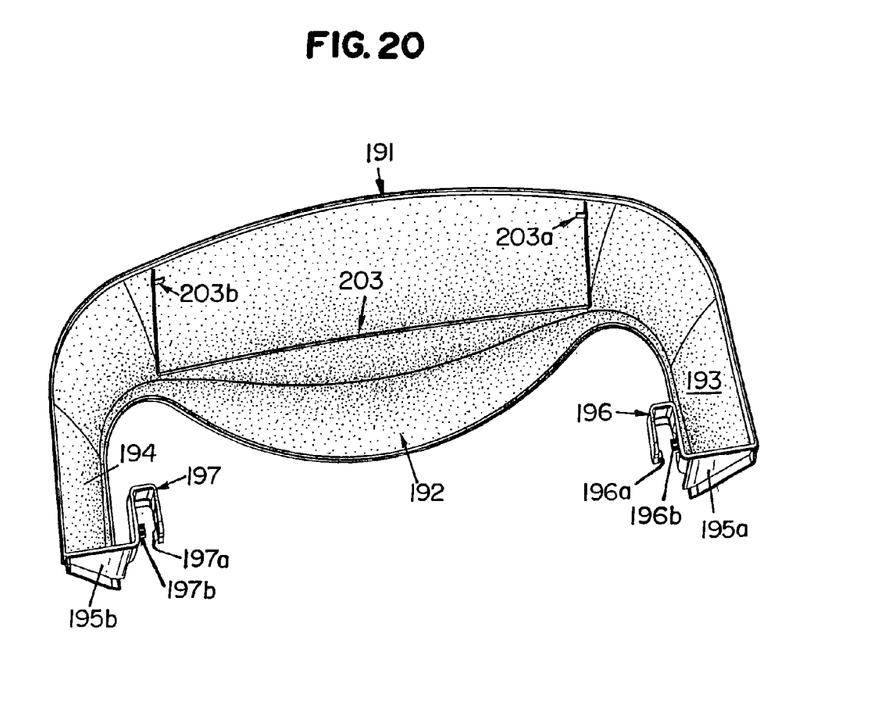
FIG. 20 is a rear perspective view of the lid of the insect trap shown in FIG. 1.
Figure 21:
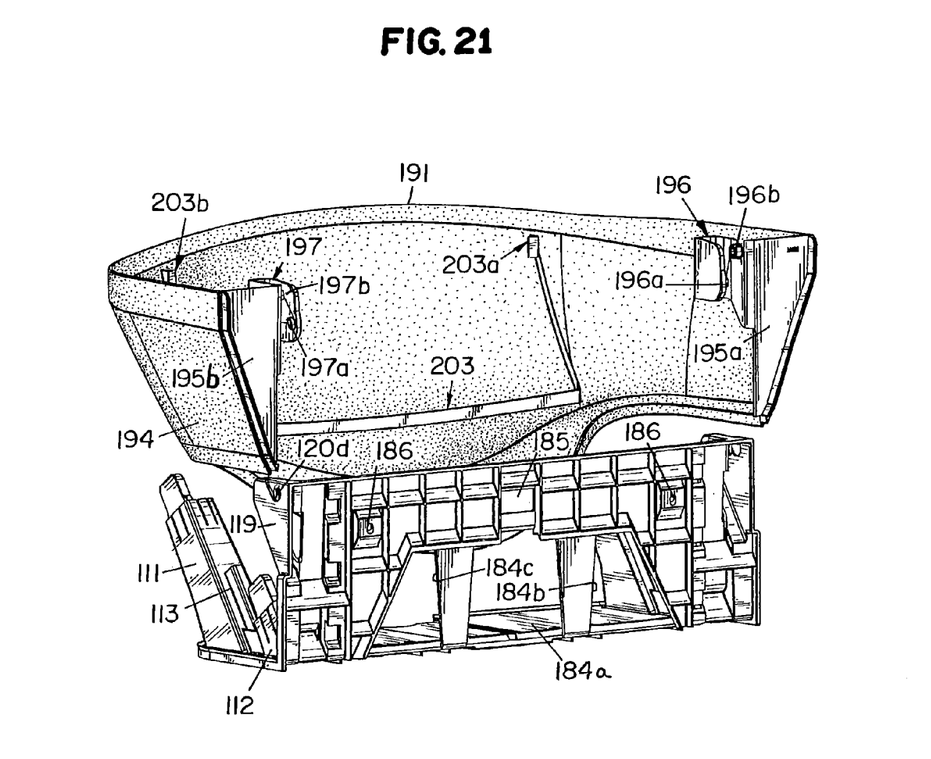
FIG. 21 is a rear perspective view of the support structure and the lid of the insect trap shown in FIG. 1.

The connectors 196 and 197 are configured and arranged to receive the protrusions 117 and 119 of the support structure 103. The first connector 196 includes an inner connector 196a proximate the inner surface 117a of the protrusion 117 and an outer connector 196b proximate the outer surface 117b of the protrusion 117. The second connector 197 includes an inner connector 197a proximate the inner surface 119a of the protrusion 119 and an outer connector 197b proximate the outer surface 119b of the protrusion 119. This is shown in FIG. 20. The outer connectors 196b and 197b extend into the receivers, and the lid 190 pivots about the outer connectors 196b and 197b and the receivers. The inner connectors 196a and 197a extend into the lower depressions when the lid 190 is in a closed position and into the upper depressions when the lid 190 is in an open position. As the lid 190 pivots upward and downward between the closed and open positions, the inner connectors 196a and 197a move from the lower depressions over the raised portions into the upper depressions. As the connectors 196 and 197 move over the raised portions, the connectors 196 and 197 deflect outward. The connectors 196 and 197 move inward when the inner connectors 196a and 197a slide into the upper and lower depressions. In the closed position, the sides 193 and 194 of the lid 190 extend over the lips 156a and 157a and the front portion 191 extends over a portion of the front portion 155 of the base 152 to conceal the power cord 166 wound about the brackets 162 and 163.

Further, the lid 190 may be disconnected from the support structure 103 without the use of tools. The connectors 196 and 197 deflect outward, similarly as to how the connectors 196 and 197 deflect outward when the lid 190 moves between the closed and open positions, and then the inner and outer connectors are removed from the depressions and the receivers. The lid 190 may be similarly connected to the support structure 103.

Figure 18:
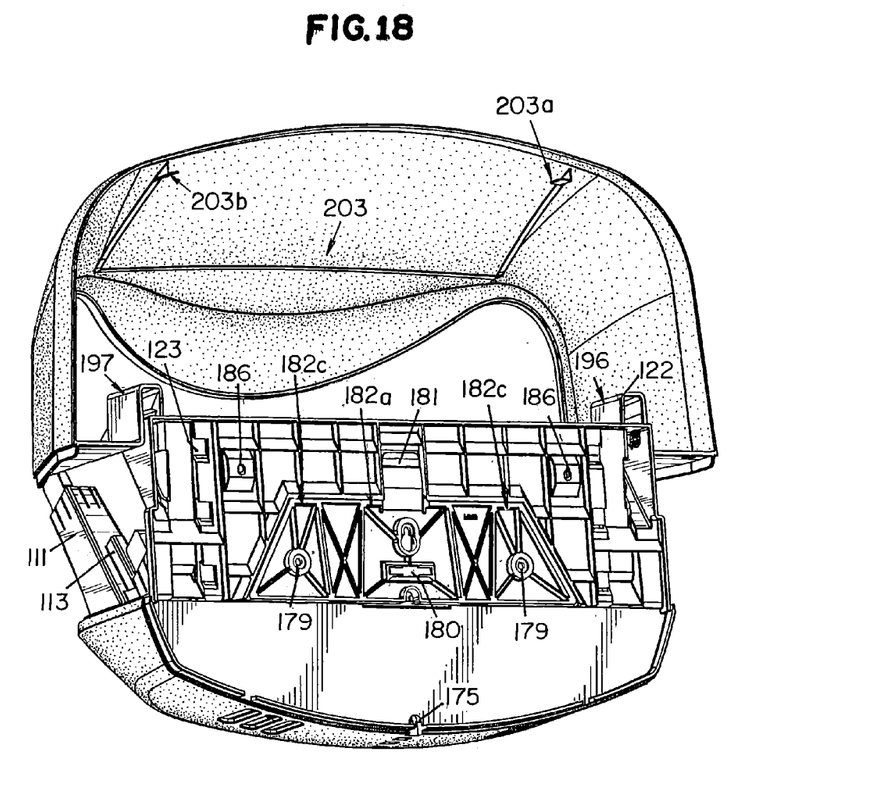
FIG. 18 is a rear perspective view of the insect trap shown in FIG. 1 with the lid in an open position.

The inside surface of the lid 190 includes a receiving portion 203, which is preferably an angled ledge forming three sides of a rectangle, that extends outward from the lid 190. The receiving portion 203 is shown in FIG. 18. The three sides are angled inward and are proximate the bottom and sides of the lid 190. Proximate the top of the lid 190 the receiving portion 203 forms an opening and one side includes a connector 203a and the opposing side includes a connector 203b proximate the opening. The connectors 203a and 203b are preferably tabs extending inward from the receiving portion 203. The connectors 203a and 203b are preferably also angled so that the bottoms are closer to the lid 190 than the tops of the connectors 203a and 203b. The receiving portion 203 is configured and arranged to receive a panel member. The panel member is preferably slid through the opening so that the three sides of the receiving portion 203 support the corresponding sides of the panel member and the connectors 203a and 203b hold the panel member against the lid 190.

Figure 19:
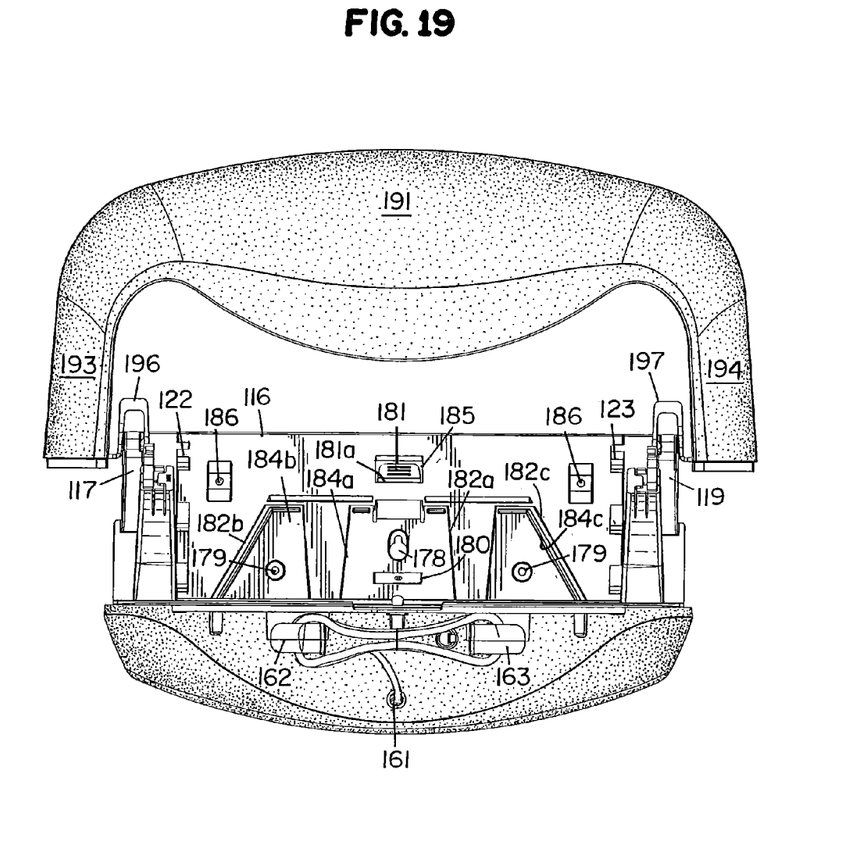
FIG. 19 is a front view of the insect trap shown in FIG. 1 with the lid in an open position.

As shown in FIG. 19, the rear wall portion 116 of the support structure 103 could also include receiving portions 184a, 184b, and 184c and an aperture 185 configured and arranged to receive portions of a mounting plate 177. FIGS. 1, 2, 9, and 11 do not show these features of the rear wall portion 116. The receiving portion 184a is preferably a generally isosceles trapezoid shaped opening with a notched portion proximate the top. The receiving portion 184a is in the middle of receiving portions 184b and 184c, which are preferably mirror images of one another. The receiving portions 184b and 184c are preferably generally trapezoid shaped openings with the outer sides having smaller angles relative to the tops and bottoms than the inner sides. Above the middle receiving portion 184a is a rectangular shaped aperture 185. Proximate the tops and the sides of the side receiving portions 184b and 184c are apertures 186, which could be used for mounting the rear wall portion 116 directly to a mounting surface.

The mounting plate 177 could be used to mount the housing 101 onto a mounting surface such as a wall. The mounting plate 177 is preferably an isosceles trapezoidal shaped plate with the top being shorter than the bottom. The mounting plate 177 includes a supporting portion 182, which preferably includes three raised portions 182a, 182b, and 182c corresponding with the receiving portions 184a, 184b, and 184c. A first aperture 178, which is preferably key-hole shaped, is proximate the middle of the raised portion 182a, and a side aperture 179 is proximate the middle of each raised portion 182b and 182c. A leveling device 180, preferably a bubble level, is proximate below the first aperture 178. A quick release member 181 extends upward from proximate the middle and the top of the raised portion 182a, and includes a ledge 181a extending outward forwardly therefrom. The quick release member 181 corresponds with the aperture 185, and the ledge 181a extends outward proximate the bottom of the aperture 185. The quick release member 181 is preferably pliable.

To mount the mounting plate 177 to a mounting surface, a fastener (not shown) is inserted into the mounting surface in the desired location, and then the fastener is inserted through the larger portion of the first aperture 178. The mounting plate 177 is then slid downward so that the fastener extends through the smaller portion of the first aperture 178. The mounting plate 177 is then leveled using the leveling device 180. Once the mounting plate 177 is level, fasteners are inserted through the apertures 179 and into the mounting surface.

To attach the rear wall portion 116 to the mounting plate 177, the rear wall portion 116 is placed against the mounting plate 177 with the receiving portions 184a, 184b, and 184c positioned above the corresponding raised portions 182a, 182b, and 182c. The rear wall portion 116 is then moved downward so that the raised portions 182a, 182b, and 182c slide into the receiving portions 184a, 184b, and 184c. When the rear wall portion 116 is pushed against the mounting plate 177, the quick release member 181 is deflected backwardly, and when the raised portions 182a, 182b, and 182c slide into the receiving portions 184a, 184b, and 184c, the quick release member 181 moves back into position so that at least a portion of the ledge 181a overlaps with the bottom of the aperture 185. The rear wall portion 116 may then be released. The rear wall portion 116 proximate the top of the receiving portion 184a contacts the top of the raised portion 182a and the rear wall portion 116 proximate the tops and the sides of the receiving portions 184b and 184c contact the corresponding tops and sides of the raised portions 182b and 182c to support the rear wall portion 116 on the mounting surface. Once the rear wall portion 116 is thus engaged by the mounting plate 177, the rear wall portion cannot be moved in a downward direction because of the raised portions 182a, 182b, and 182c and cannot be moved in an upward direction because of the quick release member 181.

The insect trap 100 could be mounted to a mounting surface using the mounting plate 177 or by mounting the rear wall portion 116 directly to the mounting surface. When the insect trap 100 is mounted on a vertical mounting surface, the opening 199 is preferably discrete and positioned so that it faces upwardly proximate the top of the insect trap 100.

To release the rear wall portion 116 from the mounting plate 177, the quick release member 181 is pushed backward so that the ledge 181a no longer overlaps with the bottom of the aperture 185. The rear wall portion 116 may then be moved upward so that the raised portions 182a, 182b, and 182c do not extend into the receiving portions 184a, 184b, and 184c. If the insect trap 100, excluding the mounting plate 177, needs to be repaired or replaced, another insect trap 100 could be hung on the same mounting plate 177 without the use of any tools and without putting any additional holes into the mounting surface.

Figure 11:
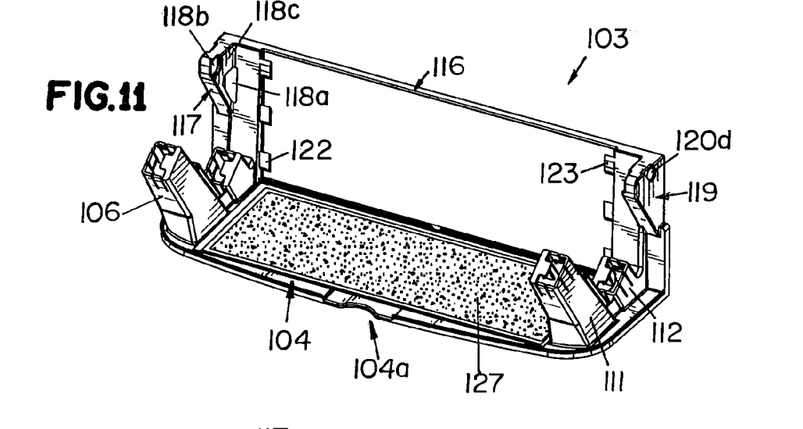
FIG. 11 is a front perspective view of a support structure of the insect trap shown in FIG. 1 supporting a panel member.
Figure 12:
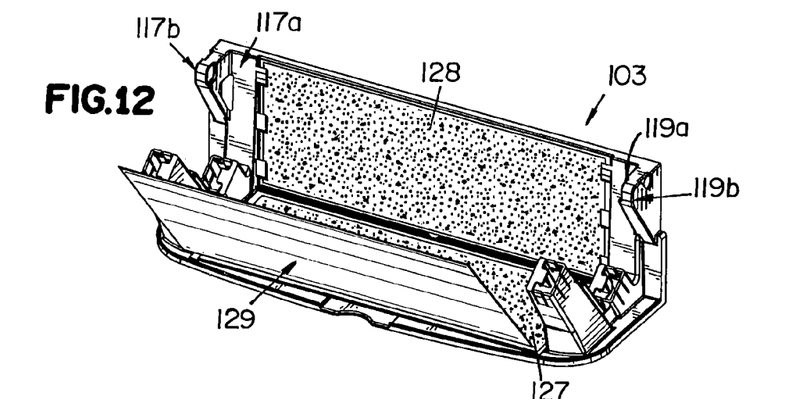
FIG. 12 is a front perspective view of the support structure shown in FIG. 11 supporting three panel members.
Figure 13:
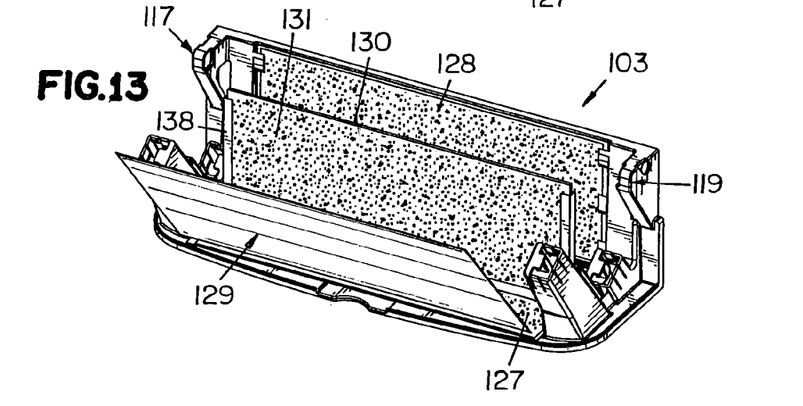
FIG. 13 is a front perspective view of the support structure shown in FIG. 11 supporting five panel members.

The insect trap 100 is configured and arranged to receive up to five panel members, which could be glue boards or boards with reflective surfaces. FIG. 11 shows a first panel member 127 positioned on the bottom surface 104 of the support structure 103. A maintenance record card could be positioned within the recessed area 104a underneath the first panel member 127. FIG. 12 shows a second panel member 128 within the recessed area 121 of the rear wall portion 116. Although the lid 190 is not shown, FIGS. 12 and 13 show a third panel member 129 as it would be positioned if the lid 190 were connected and in the closed position. FIG. 13 shows back-to-back fourth and fifth panel members 130 and 131 in the bracket 138. FIGS. 11-13 are illustrative and it is recognized that the placements and numbers of the panel members in the insect trap 100 are not limited by these illustrations. The number and the type of panel members used depend upon the need. For increased capacity, a higher number of panel members should be used.

The length of the power cord 166 is easily adjustable to accommodate varying distances between the desired location for mounting the insect trap 100 on a mounting surface and the power supply. If it is desired to lengthen the power cord 166, the power cord 166 is unwound from the brackets 162 and 163 and then simply pulled through the aperture 161, the connectors 174, and the exit 175. It may be necessary to first create some slack in the power cord 166 by pulling the power cord through the exit 175, the connectors 174, and the aperture 161. To shorten the length of the power cord 166, the power cord is pulled through the exit 175, the connectors 174, and the aperture 161 and then wound about the brackets 162 and 163. When the lid 190 is closed, the portion of the power cord 166 wound about the brackets 162 and 163 is covered by the lid 190.

When performing maintenance on the insect trap 100, such as replacing glue boards or light bulbs, the lid 190 is moved from the closed position to the open position. The lid 190 stays in the open position until a downward force is applied to the lid 190, which deflects the connectors 196 and 197 outward as the inner connectors 196a and 197a move out of the upper depressions and over the raised portions. The connectors 196 and 197 move inward as the inner connectors 196a and 197a move into the lower depressions.

The insect trap 100 allows for improved serviceability. The lid 190, which stays in the open position, allows the service provider to use both hands to service the insect trap 100. The adjustable length of the power cord 166 allows the insect trap 100 to be mounted at varying lengths from the power source and allows any excess length to be concealed by the lid 190. Once the mounting plate 177 has been connected to a mounting surface, the mounting plate 177 allows the insect trap 100 to be connected and disconnected to the mounting surface without the use of tools. The mounting plate 177 also assists in mounting the insect trap 100 so that it is level. Also, the

We claim:

1. An insect trap, comprising:
   a support structure including a bottom portion and a rear portion extending upward from a rear of the bottom portion, the rear portion including a first connector;
   a lid pivotally connected to the rear portion, the lid including an inside surface with a second connector, the support structure and the lid defining a cavity;
   a first source of insect attractant light supported by the support structure within the cavity;
   a bracket mount extending upward from the bottom portion proximate the first source of insect attractant light;
   a U-shaped bracket operatively and releasably connected to the bracket mount, the bracket including a bottom and sides extending upward from the bottom to form a third connector, the third connector including a channel portion and being positioned between the first connector and the second connector; and
   wherein the bottom portion is configured and arranged to receive a first panel member, the first connector is configured and arranged to receive a second panel member, the second connector is configured and arranged to receive a third panel member, and the third connector is configured and arranged to receive a fourth panel member, the fourth panel member being received in the channel portion.

2. The insect trap of claim 1, wherein at least one of the panel members is a member selected from the group consisting of a glue board and a board having a reflective surface.

3. The insect trap of claim 1, wherein the fourth panel member is a first glue board and a second glue board, the first and second glue boards being back-to-back and facing away from one another.

4. The insect trap of claim 1, further comprising a second source of insect attractant light supported by the support structure within the cavity, wherein the bracket is positioned between the first and second sources of insect attractant light.

5. The insect trap of claim 1, wherein at least one of the bracket and the fourth panel member is retrofittable and removable depending upon need.

6. An insect trap, comprising:
   a housing including a support structure and a lid defining a cavity, the housing having a top, a first side, and a second side;
   the support structure includes a bottom portion and a rear portion extending upward from a rear of the bottom portion, the rear portion having a first protrusion proximate the top and the first side and a second protrusion proximate the top and the second side, the first protrusion having a first inner surface and a first outer surface and the second protrusion having a second inner surface and a second outer surface, the first inner surface having a first lower depression and a first upper depression with a first raised portion between the first lower depression and the first upper depression, the first outer surface having a first receiver, the second inner surface having a second lower depression and a second upper depression with a second raised portion between the second lower depression and the second upper depression, the second outer surface having a second receiver;
   the lid includes a first connecting member proximate the first side and a second connecting member proximate the second side, the first connecting member having a first outer connector and a first inner connector, the first receiver receiving the first outer connector, the first inner connector being configured and arranged to move between the first lower depression and the first upper depression, the second connecting member having a second outer connector and a second inner connector, the second receiver receiving the second outer connector, the second inner connector being configured and arranged to move between the second lower depression and the second upper depression, the lid being pivotally connected to the rear portion about the outer connectors and having a closed position and an open position, the lid being in the closed position when the inner connectors are in the lower depressions, the lid being in the open position when the inner connectors are in the upper depressions, wherein the connecting member deflects outward proximate the inner connectors as the inner connectors move over the raised portions, the upper depressions holding the lid in the open position.

7. The insect trap of claim 6, wherein the connecting members are U-shaped brackets with opposing sides, the outer connectors and the inner connectors extend outward from the opposing sides toward one another.

* * * * *